US006912002B1

(12) United States Patent
Soga

(10) Patent No.: US 6,912,002 B1
(45) Date of Patent: Jun. 28, 2005

(54) DIGITAL STILL CAMERA AND METHOD OF CONTROLLING THE SAME

(75) Inventor: Takashi Soga, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/549,044

(22) Filed: Apr. 13, 2000

(30) Foreign Application Priority Data

Apr. 13, 1999 (JP) .......................................... 11-104811

(51) Int. Cl.[7] ................................................ H04N 5/76
(52) U.S. Cl. ................................ 348/231.2; 348/231.7
(58) Field of Search ........................ 348/231.99–231.9; 707/104.1

(56) References Cited

U.S. PATENT DOCUMENTS

| | | | | |
|---|---|---|---|---|
| 5,633,678 A | * | 5/1997 | Parulski et al. .......... 348/231.5 |
| 5,717,496 A | * | 2/1998 | Satoh et al. ................. 358/402 |
| 5,719,987 A | * | 2/1998 | Kawamura et al. .......... 386/120 |
| 5,806,072 A | * | 9/1998 | Kuba et al. .................. 707/200 |
| 5,986,701 A | * | 11/1999 | Anderson et al. ........ 348/231.6 |
| 6,085,195 A | * | 7/2000 | Hoyt et al. .................... 707/10 |
| 6,765,612 B1 | * | 7/2004 | Anderson et al. ........ 348/231.2 |

* cited by examiner

Primary Examiner—Wendy R. Garber
Assistant Examiner—Timothy J. Henn
(74) Attorney, Agent, or Firm—Birch, Stewart, Kolasch & Birch, LLP

(57) ABSTRACT

In order to easily manage image data for each image pickup theme, the last one of consecutive frame numbers for the image pickup theme is stored in a flash memory in a digital still camera. When the image pickup theme is set, the last frame number for the image pickup theme is read out of the flash memory, and new frame numbers are assigned to image data obtained by imaging such that they are consecutive frame numbers in the image pickup theme. Since the consecutive frame numbers are assigned for the image pickup theme, the image data for the image pickup theme become relatively easy to manage.

7 Claims, 8 Drawing Sheets

| IMAGE PICKUP THEME | FRAME NUMBER |
|---|---|
| FLOWER | DSC.00010 |
| SPORTS | DSC.00030 |
| PEOPLE | DSC.00024 |
| SKY | DSC.00012 |
| MOUNTAIN | DSC.00000 |
| SEA | DSC.00050 |
| ANIMAL | DSC.00005 |
| TRAVEL | DSC.00100 |
| ⋮ | ⋮ |

Fig. 2

| IMAGE PICKUP THEME | FRAME NUMBER |
|---|---|
| FLOWER | DSC.00010 |
| SPORTS | DSC.00030 |
| PEOPLE | DSC.00024 |
| SKY | DSC.00012 |
| MOUNTAIN | DSC.00000 |
| SEA | DSC.00050 |
| ANIMAL | DSC.00005 |
| TRAVEL | DSC.00100 |
| ⋮ | ⋮ |

*Fig. 3*

SET-UP

COMPRESSION PATE  : NORMAL

NUMBER OF PIXELS  : 1280 × 1024

FRAME NUMBER MEMORY  : THEME

DATE AND TIME  : SET   ~31

RESET  : EXECUTE

DIGITAL STILL CAMERA AND METHOD OF CONTROLLING THE SAME

BACKGROUND OF THE INVENTION

1. Field of the Invention

The present invention relates to a digital still camera for recording on a recording medium image data obtained by imaging with the image data related to a frame number and a method of controlling the same.

2. Background of the Invention

Digital still cameras are for imaging a subject to obtain image data representing an image of the subject and recording the obtained image data on a recording medium such as a memory card. A frame number (a file name) is assigned to a frame corresponding to an image represented by image data. In many of the digital still cameras, the frame-number is reset to start with one every time the memory card is replaced.

The image data obtained by the imaging using the digital still camera is generally transferred to a personal computer from the digital still camera and temporarily stored in a hard disk for the personal computer. As described above, the frame number is reset every time the memory card is replaced. Accordingly, the same frame number may, in some cases, be assigned to different image data. In order to store the different image data having the same frame number in the same hard disk, the image data must be respectively stored in different folders. Therefore, a folder must be created for each memory card.

Even if a folder is created for each image pickup theme, frame numbers must be newly assigned to image data, respectively, such that they are not the same number using the personal computer in order to store the image data in the folder.

SUMMARY OF THE INVENTION

An object of the present invention is to provide a digital still camera capable of assigning different frame numbers for each image pickup theme and a method of controlling the same.

A digital still camera according to the present invention is characterized by comprising an imaging device (means) for imaging a subject and outputting image data representing an image of the subject; an image pickup theme setting device (means) for setting an image pickup theme; a frame number storage device (means) for storing, for the image pickup theme set by the image pickup theme setting device, a frame number; a frame number increment device (means) for incrementing, every time the subject is imaged by the imaging device, the frame number for the image pickup theme set by the image pickup theme setting device out of the frame numbers stored in the frame number storage device; a storage control device (means) for controlling the frame number storage device such that the frame number incremented by the frame number increment device is stored for the corresponding image pickup theme; and an image data recording control device (means) for recording on a recording medium corresponding to the image pickup theme set by the image pickup theme setting device data representing the frame number incremented by the frame number increment device and the image data outputted from the imaging device by the imaging under the set image pickup theme with the data and the image data related to each other.

The present invention also provides a method suitable for the camera. That is, the method comprises the steps of allowing an image pickup theme to be set; storing, for the set image pickup theme, a frame number; imaging a subject, to obtain image data representing an image of the subject; incrementing, every time the subject is imaged, the frame number for the set image pickup theme out of the stored frame numbers; storing the incremented frame number for the corresponding image pickup theme; and recording on a recording medium corresponding to the set image pickup theme data representing the incremented frame number and the image data obtained by the imaging under the set image pickup theme with the data and the image data related to each other.

According to the present invention, the image pickup theme can be set, and the frame number is stored for the image pickup theme. The recording medium is determined for each image pickup theme by a user. The recording medium corresponding to the set image pickup theme is mounted on the digital still camera. When the subject is imaged, the frame number for the set image pickup theme out of the stored frame numbers is incremented. The incremented frame number is stored. The data representing the incremented frame number and the image data obtained by the imaging are recorded on the recording medium corresponding to the set image pickup theme. An inherent frame number is assigned for each image pickup theme to the image data recorded on the recording medium.

Specific methods of using are as follows. A folder is created for each image pickup theme in a hard disk for a personal computer. Image data recorded on a recording medium and data representing a frame number are transmitted to the personal computer. A folder storing the image data recorded on the recording medium and the data representing the frame number is dragged and dropped in the folder for each image pickup theme which has already been created in the personal computer. The frame number is not overlapped with the frame number assigned to the image data which has already been stored in the folder. A folder having image data for each image pickup theme can be updated by only dragging and dropping the folder storing the image data recorded on the recording medium and the data representing the frame number in the folder for each image pickup theme which has already been created in the personal computer. The image data for each image pickup theme becomes easy to manage.

As the setting of an image pickup theme, a plurality of image pickup themes may be stored, and the desired image pickup theme may be selected out of the stored image pickup themes. The image pickup theme becomes easy to set.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2 illustrates the contents of a flash memory;

FIGS. 3 to 7 illustrate examples of a display screen of a monitor-display device in the digital still camera;

DESCRIPTION OF THE PREFERRED EMBODIMENTS

Figure 1:
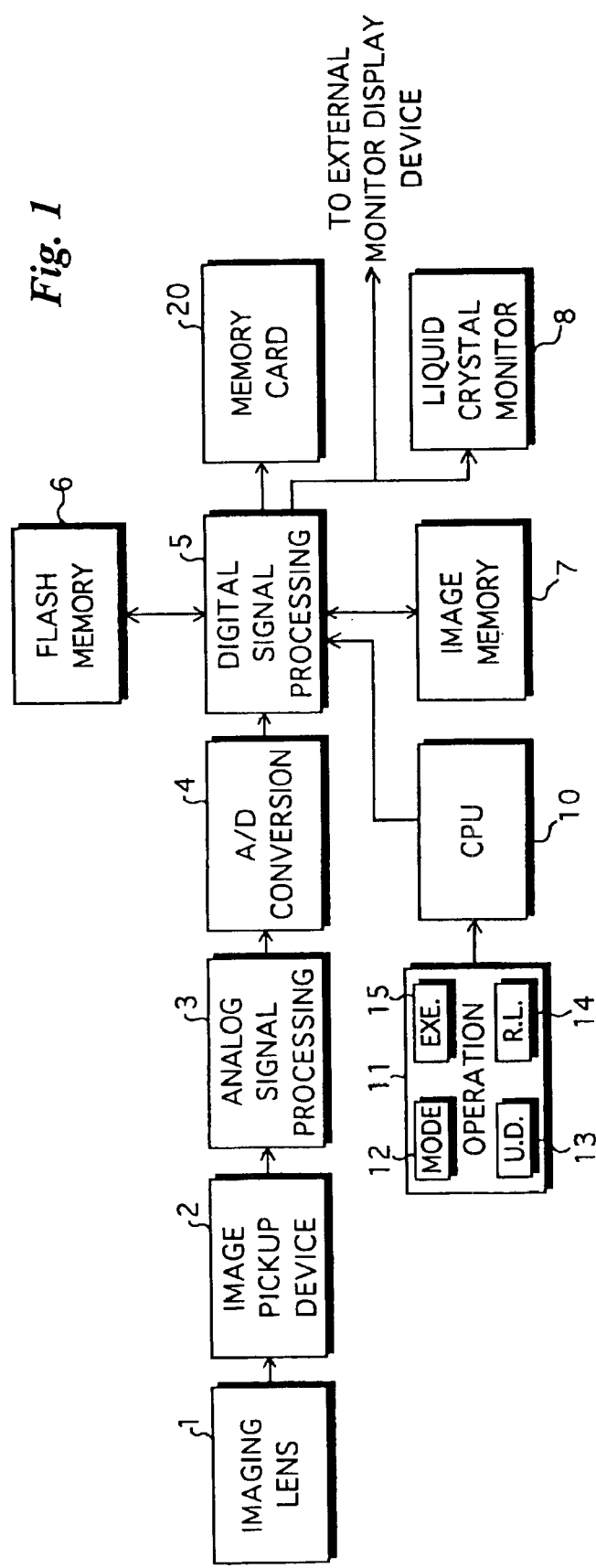
FIG. 1 is a block diagram showing the electrical configuration of a digital still camera.

FIG. 1 is a block diagram showing the electrical configuration of a digital still camera.

The overall operation of the digital still camera is supervised by a CPU 10.

The digital still camera comprises an operating (console) unit 11. The operating unit 11 comprises a mode setting key 12, an up-and-down key (a key for designating an up-direction and a key for designating a down-direction) 13, a right-and-left key (a key for designating a left-direction and a key for designating a right-direction) 14, and an execution key 15. A signal representing the setting of the mode setting key 12, the up-and-down key 13, the right-and-left key 14, and the execution key 15 is inputted to the CPU 10.

The digital still camera further comprises a liquid crystal monitor display device 8. A setup screen and a subject image are displayed, as described later, on a display screen of the liquid crystal monitor display device 8.

The subject image is formed on a light receiving surface of an image pickup device 2 by an imaging lens 1. An image signal representing the subject image is outputted from the image pickup device 2, and is inputted to an analog signal processing circuit 3. In the analog signal processing circuit 3, predetermined analog signal processing such as CDS (correlated double sampling) and white balance processing is performed. The image signal outputted from the analog signal processing circuit 3 is inputted to an analog-to-digital conversion circuit 4. In the analog-to-digital conversion circuit 4, the image signal is converted into digital image data.

When digital image data obtained by the imaging is recorded on a memory card 20, the digital image data obtained by the conversion in the analog-to-digital conversion circuit 4 is first fed to an image memory 7 after merely passing through a digital signal processing circuit 5. The digital image data is temporarily stored in the image memory 7. Next, the digital image data is read out of the image memory 7, and is inputted to the digital signal processing circuit 5. In the digital signal processing circuit 5, predetermined digital signal processing such as luminance data and color difference data generation processing and data compression processing is performed. The image data, which has already been subjected to the digital signal processing, outputted from the digital signal processing circuit 5 is recorded on the memory card 20.

The image data which has not been subjected to the data compression processing in the digital signal processing circuit 5 is fed to the liquid crystal monitor display device 8. The subject image is displayed on the screen of the liquid crystal monitor display device 8.

Furthermore, the digital still camera is provided with an output terminal (not shown). The digital still camera and an external monitor display device can be electrically connected to each other by the output terminal. The subject image obtained by the imaging can be displayed by the external monitor display device.

The digital still camera according to the present embodiment comprises a flash memory 6.

FIG. 2 illustrates the contents of the flash memory 6.

The flash memory 6 stores a frame number (a last frame number) corresponding to an image pickup theme. Examples of the image pickup theme include "FLOWER", "SPORTS", "PEOPLE", "SKY", "MOUNTAIN", "SEA", "ANIMAL", and "TRAVEL". "FLOWER" is an image pickup theme of flowers, "SPORTS" is an image pickup theme of sports, "PEOPLE" is an image pickup theme of people, "SKY" is an image pickup theme of skies, "MOUNTAIN" is an image pickup theme of mountains, "SEA" is an image pickup theme of seas, "ANIMAL" is an image pickup theme of animals, and "TRAVEL" is an image pickup theme of travels. In the digital still camera according to the present embodiment, the image pickup theme can be set to be stored in the flash memory 6 in a theme setting processing (FIG. 8, steps 45–47) described later. A subject is imaged under an image pickup theme, to obtain image data representing an image of the subject. A frame number is assigned to the image data obtained by the imaging. In order that consecutive frame numbers are assigned to the image data for each imaging pickup theme, the last one of frame numbers which have been assigned at the time of the previous imaging under the image pickup theme is stored in the flash memory 6 for each imaging pickup theme.

When the image pickup theme is set, to image the subject, the frame number stored in the flash memory 6 with regard to the theme is incremented for each time when an image is picked-up, and the incremented frame number and the image data obtained by the imaging are recorded on the memory card 20 in correlation with each other.

The digital still camera according to the present embodiment is effective in the following case.

Assume that a user intends to pickup images of flowers. The image pickup theme is set to "FLOWER". A memory card is mounted on and connected to the digital still camera. The user shoots flowers. Image data obtained by the imaging and representing images of flowers are stored in the memory card in correlation with consecutive frame numbers. The last frame number is stored in the flash memory 6 in correspondence with the image pickup theme "FLOWER".

When returning to the own house, the user removes the memory card from the digital still camera and mounts the removed memory card on a personal computer. The image data stored in the memory card are transferred to the personal computer and recorded (copied) on a hard disk in the computer in correlation with the frame numbers. The image data and frame numbers in the memory card are erased.

Later, the erased and cleared memory card is again mounted on and connected to the digital still camera. Assume that flowers are picked-up again under the image pickup theme "FLOWER". Since the last one of frame numbers which were assigned to the image data obtained in the preceding imaging has been stored in the flash memory 6 in correspondence with the image pickup theme "FLOWER", the consecutive frame numbers starting from the number next to the last frame number stored in the flash memory 6 are assigned to the new image data obtained in the succeeding imaging and the new image data are stored in the memory card in correlation with the frame numbers. Even when the new image data and frame numbers assigned thereto are transferred to the hard disk of the personal computer from the memory card, no confusion will occur, because the frame numbers assigned to the preceding image data and frame numbers assigned to the succeeding image data are consecutive and different from one another.

FIGS. 3 to 7 illustrate an example of the display screen of the liquid crystal monitor display device 8. FIG. 8 is a flow chart showing the procedure for setting and selection processing of the image pickup theme.

When a setup mode is set by the mode setting key 12 (step 41), a setup screen shown in FIG. 3 is displayed on the display screen of the monitor display device 8.

On the setup screen, examples of setup items include "COMPRESSION RATE", "NUMBER OF PIXELS", "FRAME NUMBER MEMORY", "DATE AND TIME", and "RESET". The item "COMPRESSION RATE" is for setting the compression rate of image data in the digital signal processing circuit 5. The item "NUMBER OF PIXELS" is for setting the number of pixels along the length and the width of an image represented by image data to be recorded. 1280×1024 pixels or 640×480 pixels can be set. The item "FRAME NUMBER MEMORY" is for determining one of three types: "ON", "OFF", and "THEME". When "ON" is set, a frame number next to the last one of the frame numbers which were assigned to the image data stored in the memory card 20 which is mounted in the digital still camera is assigned to new image data obtained by the imaging. When "OFF" is set, a frame number next to the last one of the frame numbers which were assigned to the image data stored in the memory card which was used last is assigned to new image data obtained by the imaging. When "THEME" is set, consecutive frame numbers are assigned for each image pickup theme to new image data obtained by the imaging. The item "DATE AND TIME" is set when the date and time is set. The item "RESET" is set when set data is reset.

A cursor 31 is displayed on the setup screen. The up-key included in the up-and-down key 13 is pressed, so that the cursor 31 moves upward on the items. The down-key included in the up-and-down key 13 is pressed, so that the cursor 31 moves downward on the items. The right-and-left key 14 is pressed, so that the content of the item designated by the cursor 31 changes. The execution key 15 is pressed, so that the item designated by the cursor 31 is determined (confirmed).

Figure 4:
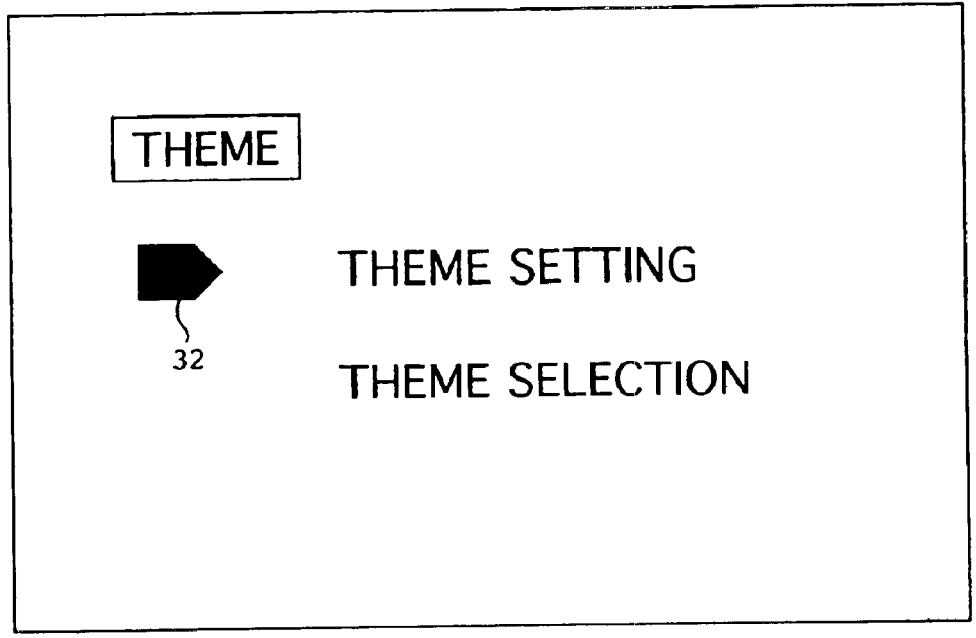

When the cursor 31 designates the item "FRAME NUMBER MEMORY" (step 42), and "THEME" is set (step 43), a theme screen shown in FIG. 4 is displayed on the monitor display device 8.

On the theme screen, items "THEME SETTING" and "THEME SELECTION" are displayed. An arrow 32 is also displayed on the theme screen. The arrow 32 moves up and down between the item "THEME SETTING" and the item "THEME SELECTION" depending on the pressing of the up-and-down key 13.

The item "THEME SETTING" is designated by a user when an image pickup theme is newly registered (is stored in the flash memory 6). When the item "THEME SETTING" is designated, the up-and-down key 13 is operated such that the arrow 32 points to the item "THEME SETTING". Thereafter, the execution key 15 is pressed. The item "THEME SELECTION" is selected by the user when the image pickup theme is selected out of the image pickup themes which have already been registered. When the item "THEME SELECTION" is designated, the up-and-down key 13 is operated such that the arrow 32 points to the item "THEME SELECTION". Thereafter, the execution key 15 is pressed.

Figure 5:
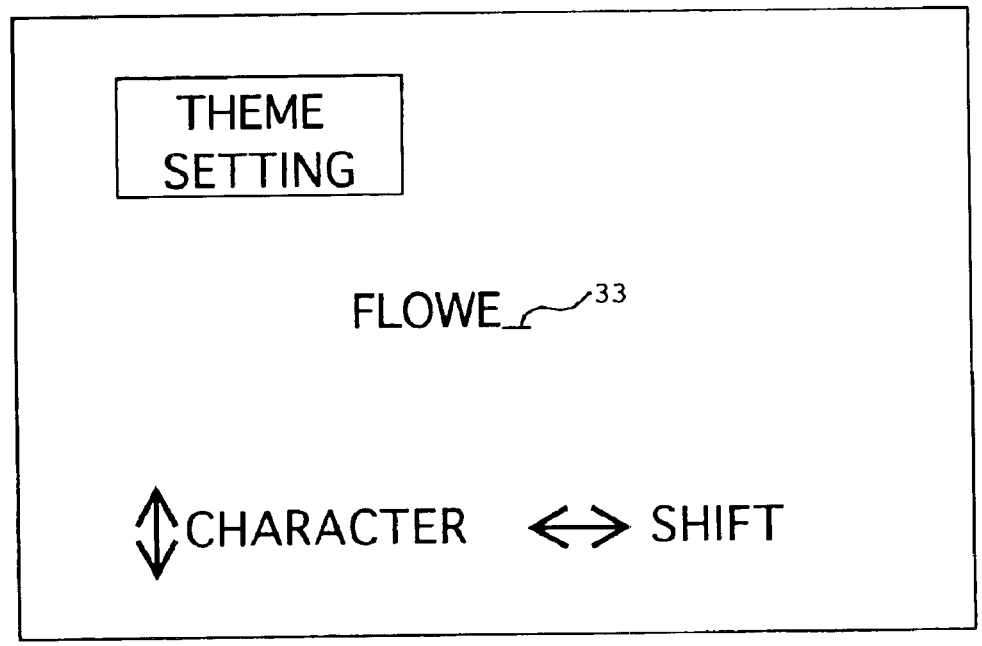

When the item "THEME SETTING" is designated (step 44), a theme setting screen shown in FIG. 5 is displayed on the display screen of the liquid crystal monitor display device 8 (step 45). An image pickup theme is newly registered while displaying the theme setting screen on the liquid crystal monitor display device 8 (step 46).

A cursor 33 is displayed on the theme setting screen. The up-and-down key 13 is pressed, so that alphabetic characters are alphabetically displayed on the cursor 33. When the right-and-left key 14 is pressed, the cursor 33 moves rightward, so that the alphabetic character displayed on a position before the movement of the cursor 33 is determined. The up-and-down key 13 is operated again until the desired alphabetic character is displayed. When the alphabetic characters expressing the image pickup theme is finally displayed, the execution key 15 is pressed, so that the image pickup theme is determined. The image pickup theme is stored in the flash memory 2 (step 47). When the image pickup theme is newly registered, it goes without saying that the last frame number is set to "DSC00001" (frame number 0) in the flash memory 6 with regard to the newly registered theme.

Figure 6:
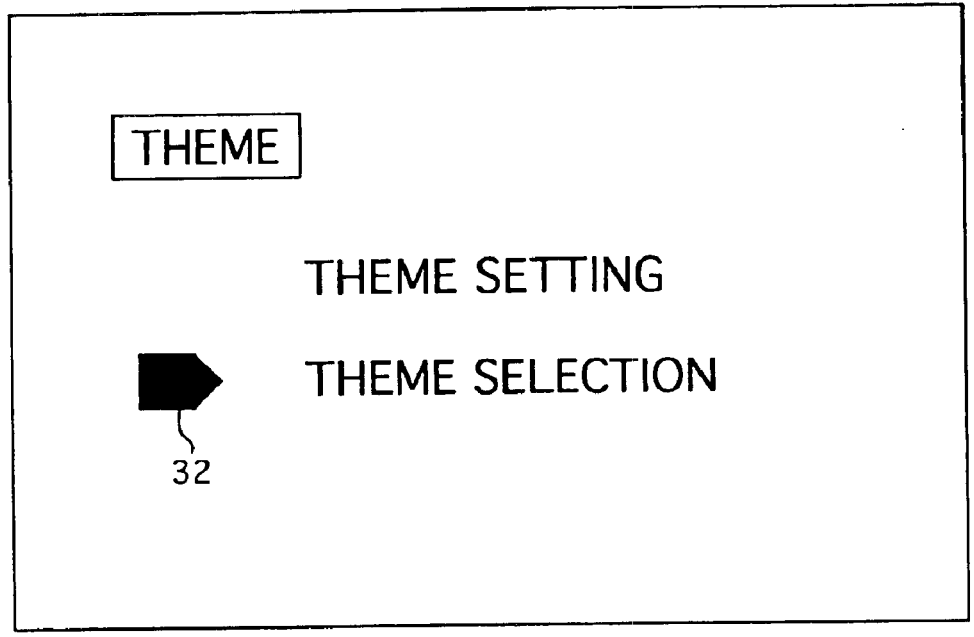
Figure 7:
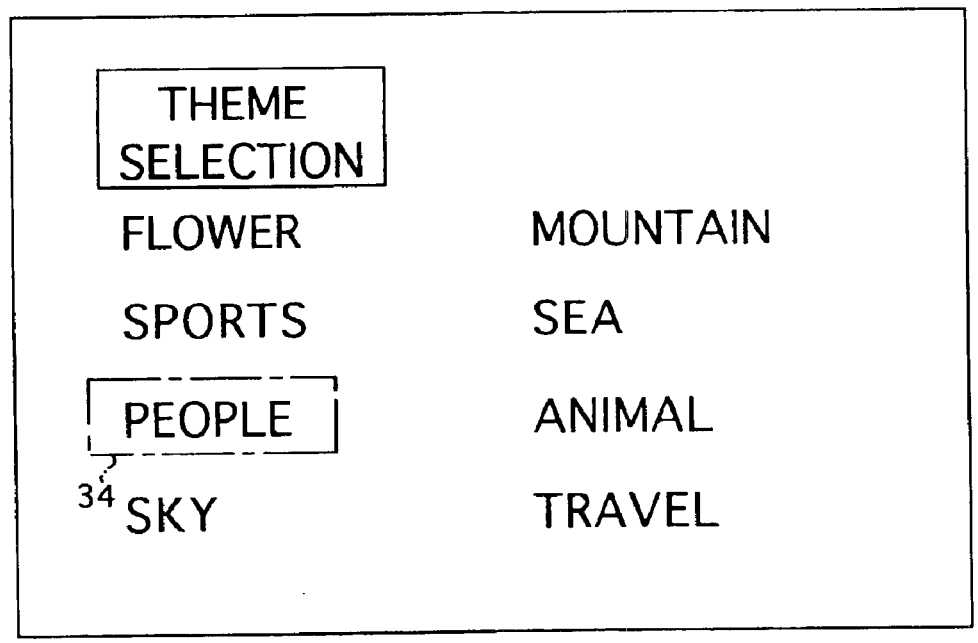
Figure 8:
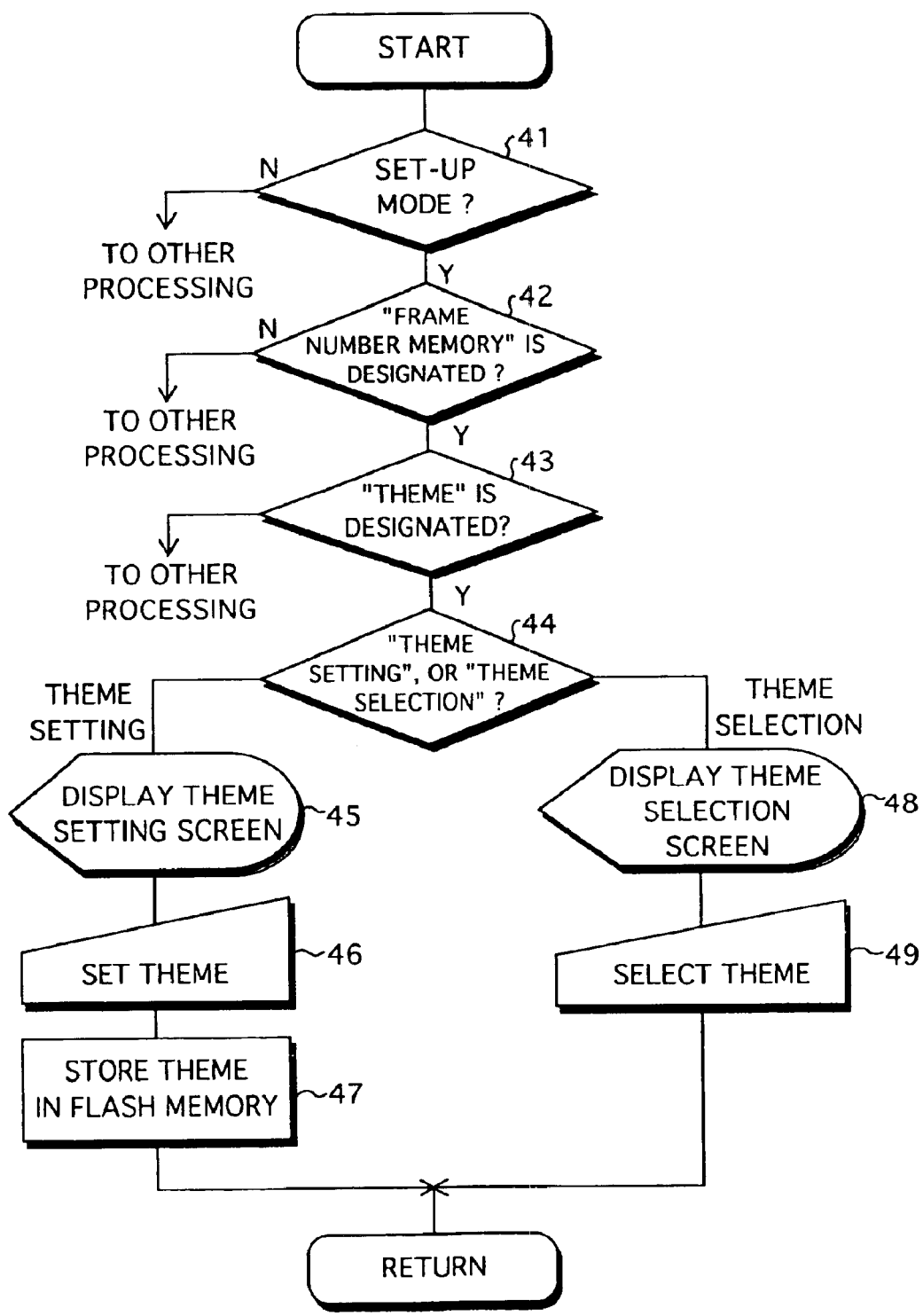
FIG. 8 is a flowchart showing the procedure for processing performed when an image pickup theme is designated.

When the item "THEME SELECTION" is designated on the theme screen, as shown in FIG. 6, a theme selection screen shown in FIG. 7 is displayed on the display screen of the monitor display device 8 (step 48).

On the theme selection screen, a list of the image pickup themes stored in the flash memory 6 is displayed. When all the image pickup themes cannot be displayed on the display screen of the monitor display device 8, it goes without saying that an image pickup theme other than the image pickup themes currently displayed is displayed by operating the up-and-down key 13.

A cursor 34 is also displayed on the theme selection screen. The up-and-down key 13 is pressed, so that the cursor 34 moves among the image pickup themes. The execution key 15 is pressed, so that the image pickup theme designated by the cursor 34 is determined (step 49).

Figure 9:
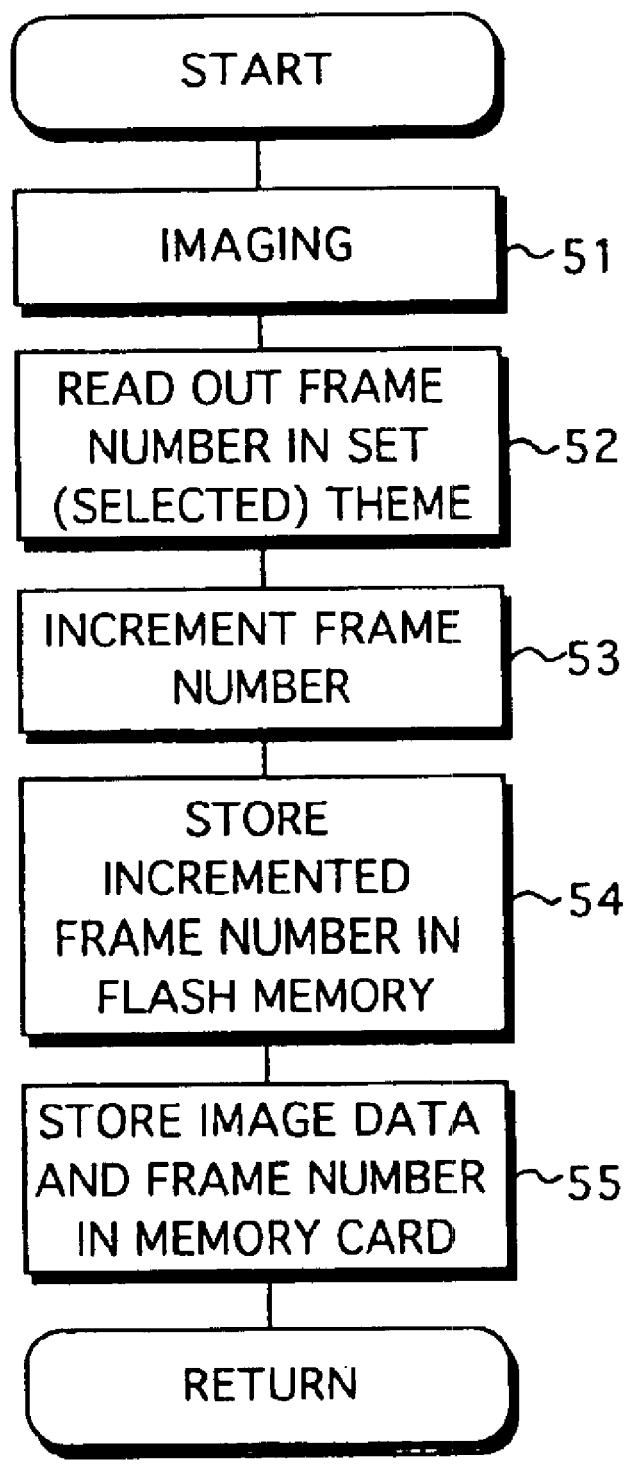
FIG. 9 is a flow chart showing the procedure for imaging processing.

FIG. 9 is a flow chart showing the procedure for processing in a case where image data obtained by imaging is recorded on the memory card.

When an imaging mode is set by the mode setting key 12, a subject is imaged by the image pickup device 2 in the above-mentioned manner (step 51). That is, when a shutter release button (not shown) is pushed, image data representing an image of the subject is temporarily stored in the image memory 7 (imaging). A (last) frame number corresponding to an image pickup theme set or selected in the setup mode, as described above, is read out of the flash memory 6 (step 52). The frame number read out is incremented because it is the last frame number relating to image data which was recorded last with regard to the image pickup theme, so that overlapping of the frame number is avoided (step 53). The incremented frame number is stored in the flash memory 6 for the corresponding image pickup theme (step 54). When image data fails to be recorded on the memory card 20, it goes without saying that the frame number is returned to the original frame number again.

Data representing the incremented frame number and the image data obtained by the imaging are recorded on the memory card 20 with the data and the image data related to each other by being stored in the same file (step 55).

In the above-mentioned processing, it goes without saying that the memory card 20 for an image pickup theme which is to be set or selected by the user is mounted on the digital still camera.

Figure 10:
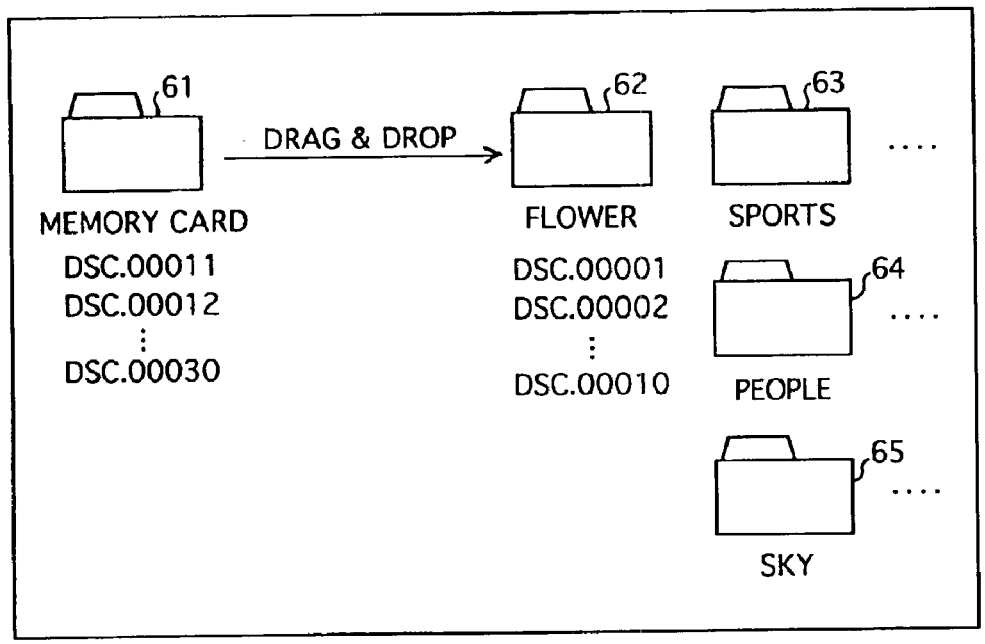
FIG. 10 illustrates an example of a display screen of a display device connected to a personal computer.

FIG. 10 illustrates an example of a display screen of a display device connected to a personal computer.

The memory card 20 in which the image data and the data representing the frame number are stored in the same file (FIG. 9 step 55) is separated from the digital still camera, and is mounted on a memory card slot in the personal computer. The file recorded on the memory card 20 is read, and is recorded on a hard disk for the personal computer. A folder 61 named "Memory Card" appears on the display screen of the display device connected to the personal computer. Files respectively storing image data which are assigned frame numbers "DSC00011" to "DSC00030" and represent images relating to flowers (the image pickup theme "FLOWER") shall be stored in the folder 61 named "Memory Card". This is based on the following fact and assumption. That is, as shown in FIG. 2, the last frame number corresponding to the image pickup theme "FLOWER" was "DSC00010". Assume that twenty frames of images have been imaged by the digital still camera under the image pickup theme "FLOWER". Accordingly, the frame numbers corresponding to the image data obtained by the imaging and stored in the memory card 20 are from "DSC00011" to "DSC00030".

Folders having names corresponding to the above-mentioned image pickup themes shall be stored in the hard disk for the personal computer. In FIG. 10, a folder 62 named "FLOWER", a folder 63 named "SPORTS", a folder 64 named "PEOPLE", and a folder 65 named "SKY" are illustrated. Files respectively having frame numbers "DSC00001" to "DSC00010" (the frame number "DSC00010" was stored in the flash memory 6 in the digital still camera as the last frame number in the image pickup theme "FLOWER") shall be already stored in the folder 62 named "FLOWER".

The folder 61 named "Memory Card" is dragged and dropped in the folder 62 named "FLOWER", so that image data respectively representing images having a unified image pickup theme of flowers shall be stored in the folder 62 named "FLOWER". Further the frame numbers of the image data (files) stored in the folder 62 are "DSC00001"~"DSC00030". A folder for each image pickup theme, which stores image data under the image pickup theme, can be created relatively easily. Folders can be also arranged relatively easily.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital still camera comprising:

an imaging device for imaging a subject and outputting image data representing an image of the subject;

an image pickup theme setting device for setting an image pickup theme;

a frame number storage device for storing, for the image pickup theme set by said image pickup theme setting device, a last frame number of a plurality of frame numbers assigned at the time of imaging;

a frame number increment device for incrementing, every time the subject is imaged by said imaging device, the last frame number for the image pickup theme set by said image pickup theme setting device out of the frame numbers stored in said frame number storage device;

a storage control device for controlling said frame number storage device such that the last frame number incremented by said frame number increment device is stored for the corresponding image pickup theme; and an image data recording control device for recording on a first recording medium data representing the last frame number incremented by said frame number increment device and the image data outputted from said imaging device by the imaging under the image pickup theme set by said image pickup theme setting device with the data and the image data related to each other, wherein said frame number storage device retains said last frame number and said frame number increment device incrementally increases said assigned frame number starting from said last frame number if a new recording medium replaces said first recording medium.

2. The digital still camera according to claim 1, wherein said image pickup theme setting device comprises an image pickup theme storage device for storing a plurality of image pickup themes; and an image pickup theme selection device for selecting the image pickup theme out of the image pickup themes stored in said image pickup theme storage device.

3. The digital still camera according to claim 1, wherein said new recording medium is said first recording medium with a cleared memory.

4. The digital still camera according to claim 1, wherein said frame number storage device stores said last frame number in a flash memory and said first recording medium is a memory card.

5. A method of controlling a digital still camera, comprising the steps of:

allowing an image pickup theme to be set;

storing, for the set image pickup theme, a last frame number of a plurality of frame numbers assigned at the time of imaging;

imaging a subject, to obtain image data representing an image of the subject;

incrementing, every time the subject is imaged, the last frame number for the set image pickup theme out of the stored frame numbers;

storing the incremented last frame number for the corresponding image pickup theme;

recording on a first recording medium data representing the incremented last frame number and the image data obtained by the imaging under the set image pickup theme with the data and the image data related to each other, and replacing said recording medium with a new recording medium, wherein said last frame number is retained and said assigned frame number is incrementally increased starting from said last frame number if the new recording medium replaces said first recording medium.

6. The method according to claim 5, wherein said new recording medium is said first recording medium with a cleared memory.

7. The method according to claim 5, wherein said last frame number is stored in a flash memory and said first recording medium is a memory card.

* * * * *